(12) United States Patent
Fredendall et al.

(10) Patent No.: US 8,657,304 B1
(45) Date of Patent: Feb. 25, 2014

(54) SHOPPING CART WITH CHILD SEAT

(75) Inventors: Jonathon A. Fredendall, Buffalo, MN (US); John Robert Ebling, Northfield, MN (US); Jay Robert Stemler, Elk River, MN (US); Gary Robert Ebling, Northfield, MN (US)

(73) Assignee: Retail Design Services, LLC, Northfield, MN (US)

( * ) Notice: Subject to any disclaimer, the term of this patent is extended or adjusted under 35 U.S.C. 154(b) by 22 days.

(21) Appl. No.: 13/293,749

(22) Filed: Nov. 10, 2011

(51) Int. Cl.
*B62D 39/00* (2006.01)
*B62B 5/08* (2006.01)

(52) U.S. Cl.
USPC .............. 280/33.993; 280/47.38; 280/79.2

(58) Field of Classification Search
USPC ............ 280/33.991, 33.992, 33.993, 33.995, 280/33.996, 33.997, 47.38, 79.2, 79.3
See application file for complete search history.

(56) References Cited

U.S. PATENT DOCUMENTS

| | | | |
|---|---|---|---|
| 2,689,133 A * | 9/1954 | Goldman | 280/33.997 |
| 3,019,953 A | 2/1962 | Umanoff | |
| 3,309,100 A | 3/1967 | Barbuti | |
| D240,297 S | 6/1976 | Trubiano | |
| D263,456 S | 3/1982 | Muellner | |
| 4,765,644 A | 8/1988 | Bell | |
| D319,906 S | 9/1991 | Takahashi | |
| 5,125,674 A | 6/1992 | Manuszak | |
| 5,649,718 A | 7/1997 | Groglio | |
| D386,873 S | 11/1997 | Langlois D'Estaintot et al. | |
| 6,098,998 A | 8/2000 | Ondrasik | |
| D444,281 S | 6/2001 | Gaze et al. | |
| D444,927 S | 7/2001 | Lin | |
| 6,406,041 B1 | 6/2002 | Rea | |
| D465,632 S | 11/2002 | Koppes et al. | |
| D468,880 S | 1/2003 | Porter | |
| 6,523,840 B1 * | 2/2003 | Koppes et al. | 280/47.35 |
| 6,932,363 B2 | 8/2005 | D'Angelo | |
| D525,758 S | 7/2006 | Lynch | |
| D540,998 S | 4/2007 | Splain et al. | |
| D550,423 S | 9/2007 | Splain et al. | |
| 7,407,169 B2 | 8/2008 | Splain et al. | |
| 7,494,135 B2 | 2/2009 | Ash et al. | |
| D606,722 S | 12/2009 | Walter | |

(Continued)

OTHER PUBLICATIONS

Michael Daehn, "The Importance of Shopping Carts," obtained from http://marketingenious.terapad.com, published Dec. 10, 2008, printed Jul. 1, 2011, 7 pages.

(Continued)

*Primary Examiner* — Jeffrey J Restifo
*Assistant Examiner* — Erez Gurari
(74) *Attorney, Agent, or Firm* — James L. Young; Westman, Champlin & Koehler, P.A.

(57) ABSTRACT

A shopping cart includes an expandable cargo compartment having opposite first and second ends, a frame to which the cargo compartment is attached, a handle disposed proximate the first end of the cargo compartment, and a foldable child seat disposed proximate the second end of the cargo compartment, wherein folding the child seat increases a capacity of the cargo compartment and wherein the child seat comprises a seat back pivotally attached to the frame. In another aspect, a shopping cart comprises a frame, a cargo compartment attached to the frame, a handle attached to the frame, and a foldable child seat. The foldable child seat comprises a rod pivotally attached to the frame, a seat back attached to the rod, a sleeve configured to slide upon the rod, and a seat bottom hingedly attached to the sleeve.

20 Claims, 13 Drawing Sheets

(56) References Cited

U.S. PATENT DOCUMENTS

| | | | |
|---|---|---|---|
| 7,959,166 | B2 | 6/2011 | Splain et al. |
| D649,732 | S | 11/2011 | Muscara |
| 2001/0035618 | A1 | 11/2001 | DeCost |
| 2002/0074753 | A1 | 6/2002 | Thalhofer et al. |
| 2005/0067801 | A1 | 3/2005 | Copland |
| 2007/0210541 | A1 | 9/2007 | Johnson |
| 2008/0211200 | A1 | 9/2008 | Eberlein |
| 2009/0315300 | A1 | 12/2009 | Stiba |

OTHER PUBLICATIONS

Sears shopping cart, obtained from www.prioritydesigns.com, copyright 2007-2011, printed Oct. 13, 2011, 7 pages.

EXpress6000—Retail Metal Shopping Cart, obtained from www.versacart.com/express6000.php, copyright 2008, printed Nov. 8, 2011, 1 page.

Claire Erickson, "My Latest Project," published at www.ericksoncl.wordpress.com/2010/05/14/my-latest-project/, posted May 14, 2010, printed Nov. 8, 2011, 1 page.

Sunrise Trolley Manufacturers, Products, obtained from www.indiamart.com/sunrise-trolley-mfg/products.html, printed Nov. 10, 2011, 9 pages.

Paul Rako, "Build a goofy shopping cart, and the media will beat a path to your door," published at www.rako.com/Diamond/28.html, dated May 21, 2011, printed Nov. 10, 2011, 4 pages.

"IDEO Shopping Trolley," The Retail Experience Project, published at http://retailsingapore.wordpess.com/2011/10/16/ideo-shopping-trolley/, post Oct. 16, 2011, print Mat 25, 2012, 2 pgs.

"IDEO Shopping Trolley," Design Against Crime, pp. 24-28 and 1 photo page, published at http://extra.shu.ac.uk/dac/ideo.pdf, obtained Nov. 2011.

"Standard Consumer Safety Performance Specification for Shopping Carts," ASTM International, W. Conshohocken, PA, US; Designation: F 2372-04, Jul. 2004, 13 pages.

Proprietary: "Kohl's Shopping Cart component Part Information," Nov. 8, 2010, 16 pages.

Proprietary: "Kohl's Stroller/Cart Manual," Feb. 13, 2006, 11 pages.

Proprietary: Leggett & Platt Store Fixtures Group, Drawings of cart and components, 5 sheets, dated Oct. 19, 2010.

Proprietary: Leggett & Platt Store Fixtures Group, Drawings of cart and components, 5 sheets dated Nov. 11, 2010.

Proprietary: Leggett & Platt Store Fixtures Group, Drawings of cart and components, 5 sheets, dated Nov. 12, 2010.

\* cited by examiner

SHOPPING CART WITH CHILD SEAT

BACKGROUND

Shopping carts incorporating child seats are known. However, many common designs have numerous drawbacks. For example, in some designs, the child seat is fixed; therefore, even when no child occupies the seat, the seat takes up valuable space that could be used to carry merchandise. In other designs having a folding child seat, the folding mechanism is often difficult to operate, sometimes resulting in pinched fingers for the user or occupant. In still other designs, the child seat is often formed from welded metal wire panels, resulting in a very uncomfortable seat. Accordingly, there is a need for an improved shopping cart including a comfortable child seat having a smooth and easily operated folding mechanism, whereby folding the child seat results in additional cargo space in the shopping cart.

SUMMARY

In one aspect, a shopping cart comprises an expandable cargo compartment having opposite first and second ends, a frame to which the cargo compartment is attached, a handle disposed proximate the first end of the cargo compartment, and a foldable child seat disposed proximate the second end of the cargo compartment, wherein folding the child seat increases a capacity of the cargo compartment and wherein the child seat comprises a seat back pivotally attached to the frame.

In another aspect, a shopping cart comprises a frame, a cargo compartment attached to the frame, a handle attached to the frame, and a foldable child seat. The foldable child seat comprises a rod pivotally attached to the frame, a seat back attached to the rod, a sleeve configured to slide upon the rod, and a seat bottom hingedly attached to the sleeve.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. The directions left and right are from the perspective of a user of the cart, standing behind the cart and positioned to push forward on the cart handle. Moreover, the forward direction or front direction refers to the direction in which the cart is pushed in normal use. Additionally, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
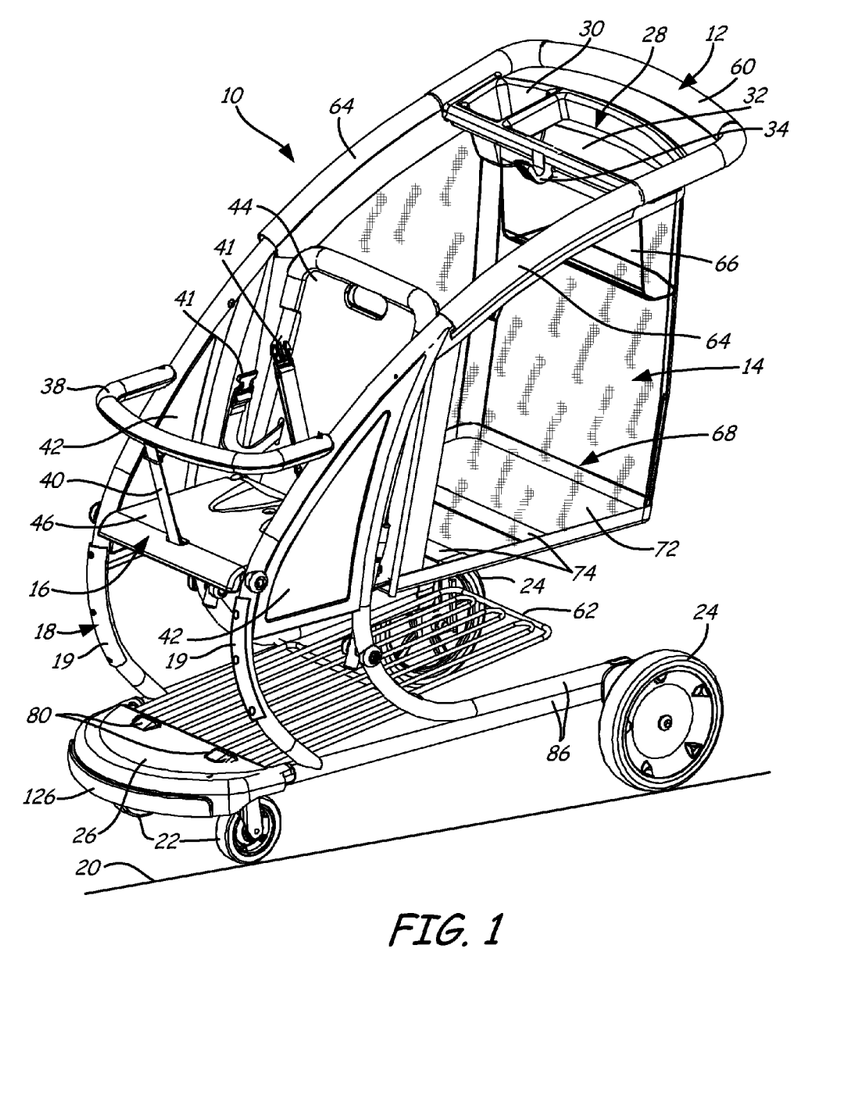
FIG. 1 is a front left perspective view of an exemplary shopping cart of the present disclosure.

FIG. 1 shows an exemplary shopping cart 10 having a handle 12, cargo bag 14 and foldable child seat 16 attached to frame 18. Cart 10 is supported on the ground surface 20 by front wheels 22 and rear wheels 24. Kick plate 26 extends across a front of frame 18 and in an exemplary embodiment is positioned about 3⅝ inches from ground surface 20. Protective covers 19 made of plastic or a similarly durable material are attached to a forward portion of frame 18 in an exemplary embodiment.

User friendly features include a large wheel base between front wheels 22 and rear wheels 24 for stability and ease of maneuvering. In an exemplary embodiment, front wheels 22 are able to swivel 360 degrees. Another feature is an injection-molded handle bar 12 having a rounded configuration for comfort and ease of use. In an exemplary configuration, a diameter of grip portion 60 of handle 12 is about 1.5 inches for the user's comfort and to facilitate handling of cart 10. Integral to handle 12 is an accessory tray 28 featuring a cup holder 30 and a well 32 for smaller items such as a customer's purse or smaller merchandise items. In an exemplary configuration, cup holder 30 includes rounded corners and edges and drain holes 58 (visible in FIG. 4) for ease of cleaning. Accessory tray 28 also includes a hook 34 (visible in FIGS. 1 and 8) for holding a customer's purse or one or more apparel hangers.

Figure 2A:
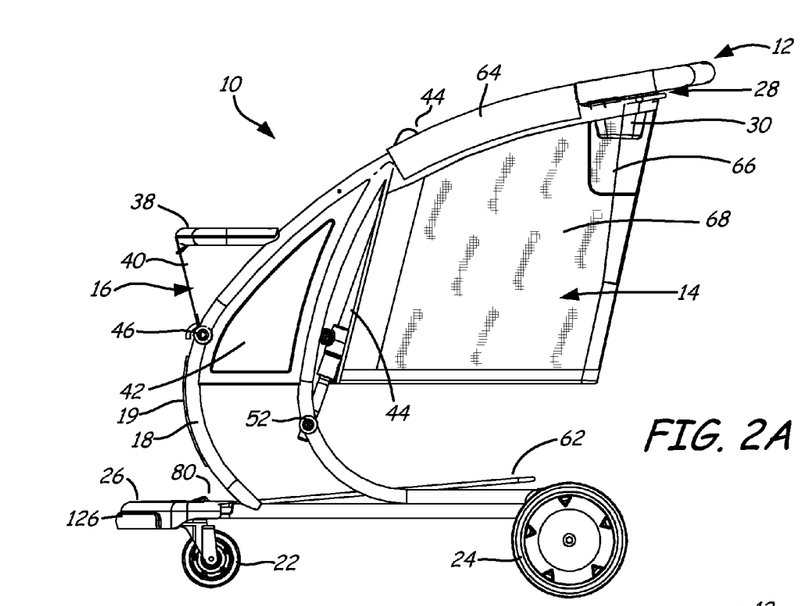
FIG. 2A is a side elevation view of the shopping cart of FIG. 1, with the child seat fully open.
Figure 2B:
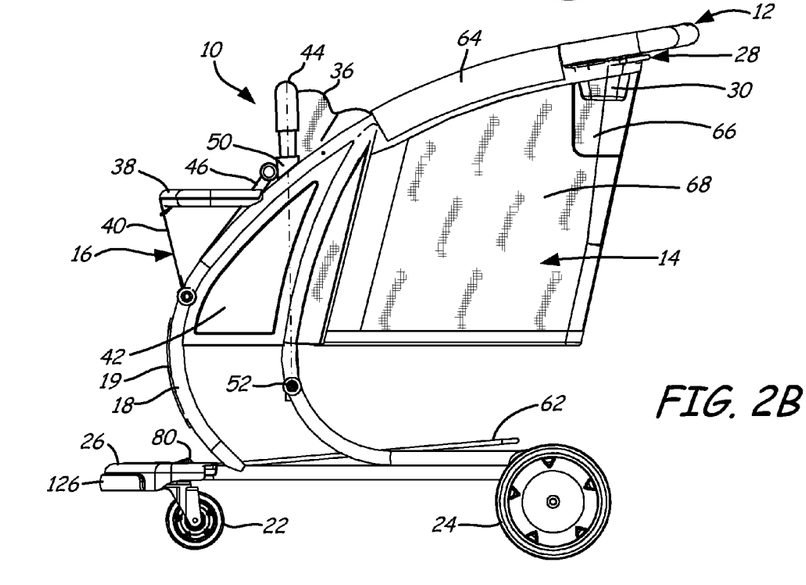
FIG. 2B is a side elevation view of the shopping cart of FIG. 1, showing the child seat in an intermediate position.
Figure 2C:
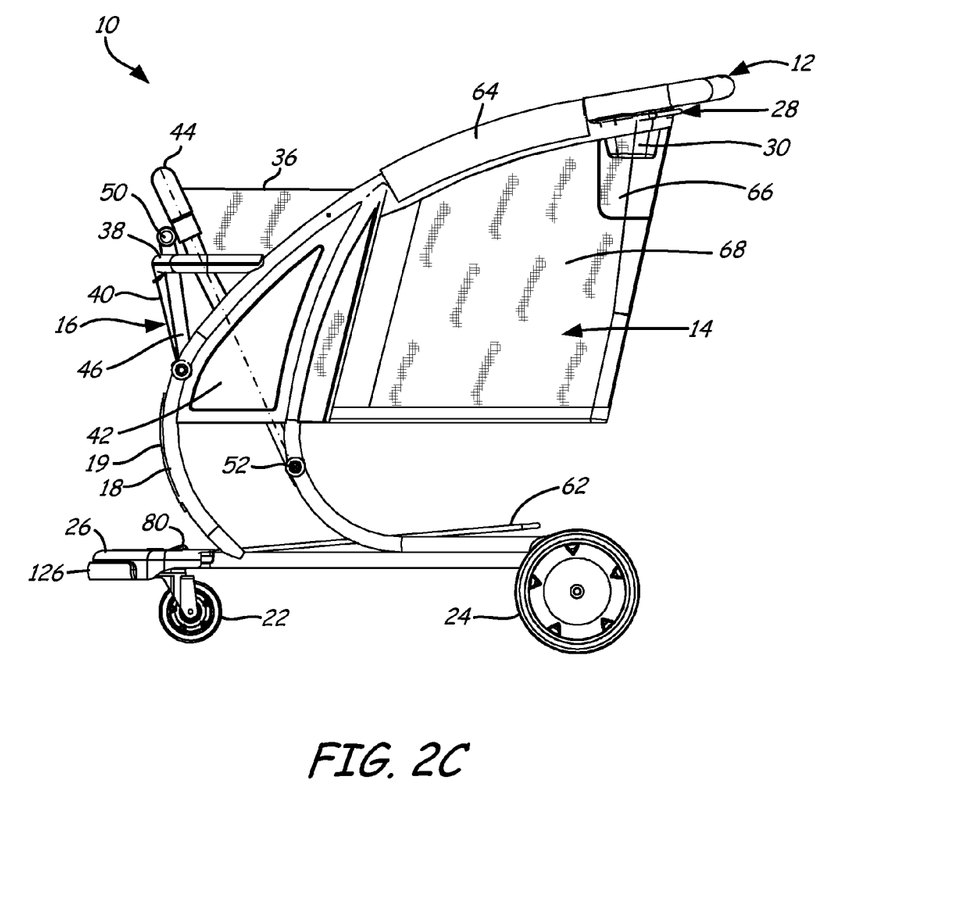
FIG. 2C is a side elevation view of the cart of FIG. 1, showing the child seat in a fully folded configuration so that space formerly occupied by the child seat is now available as additional cargo capacity for the cart.

Gussets 36 allow the capacity of cargo bag 14 to increase when child seat 16 is folded (see FIGS. 2A-2C). Front bar 38, crotch strap 40, side buckle straps 41, and side panels 42 cooperate with seat back 44 and seat bottom 46 to create an enclosure for a child seated on child seat 16. Because the child is facing forward and is seated in a front portion of the cart 10, the child has an unobstructed view of where cart 10 is going. Moreover, handle 12 with accessory tray 28 is disposed on an opposite end of cargo bag 14 relative to child seat 16. Accordingly, a child seated on child seat 16 is remote from accessory tray 28, thereby preventing the child from toppling a beverage cup that may be disposed in cup holder 30 or from accessing small items disposed in smaller compartment 66 (such as the parent's keys, cell phone or purse). Additionally, the lower center of gravity of child seat 16 compared with many state-of-the-art shopping cart child seats stability of the cart. The lower child seat 16 also makes it easier for the parent to assist the child in and out of the child seat 16.

Multiple treatments for side panels 42 are contemplated; for example, each side panel may be formed from a textile, a clear or transparent material such as acrylic, or from a sheet of perforated welded steel or polymer. In an exemplary embodiment, front bar 38 may be covered with a thermoplastic elastomer or a similarly soft and durable material for the comfort and safety of the child occupying seat 16. The curving lines of frame 18 not only lend aesthetic appeal to cart 10, but also mitigate collision damage to store fixtures, merchandise, customers, motor vehicles and other carts associated with the use of cart 10.

FIGS. 2A-2C illustrate that moving seat back 44 of child seat 16 forward increases the cargo capacity of cargo bag 14. In FIG. 2A, seat back 44 is in a fully rearward position so that child seat 16 is in its fully open configuration, as shown in FIG. 1. FIG. 2B shows seat back 44 in an intermediate position. In FIG. 2C, seat back 44 is in a fully forward position so that child seat 16 is in its folded configuration. As shown in FIG. 2C, gusset 36 on each side of cargo bag 14 is unfolded or opened to expand the effective usable size of cargo bag 14. In an exemplary embodiment, the capacity of cargo bag 14 as shown in FIG. 2A with child seat 16 in an open position is about 4.2 cubic feet. In such an exemplary embodiment, the capacity of a cargo bag 14 shown in the configuration of FIG. 2C, where child seat 16 is in the folded configuration, is about 5.0 cubic feet.

Figure 3A:
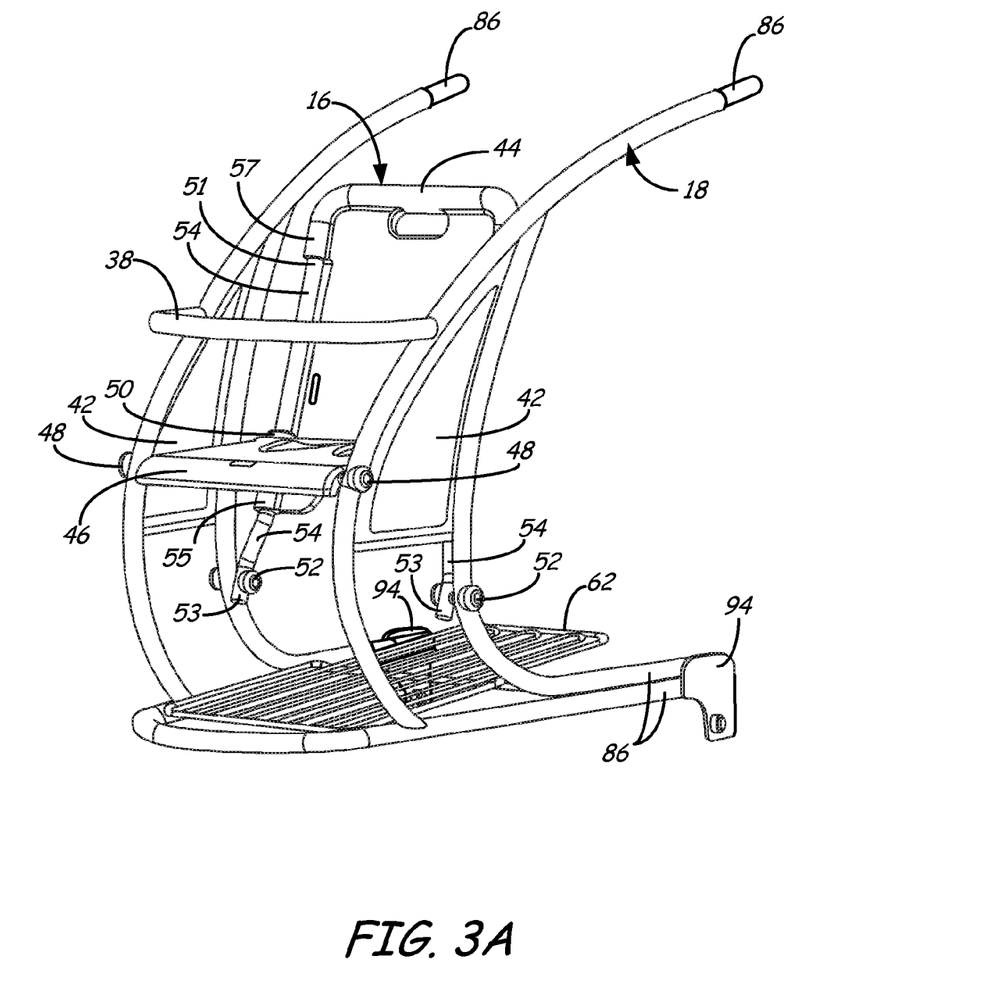
FIG. 3A is a left front perspective view of an exemplary child seat in a fully open configuration, as shown in FIGS. 1 and 2A.
Figure 3B:
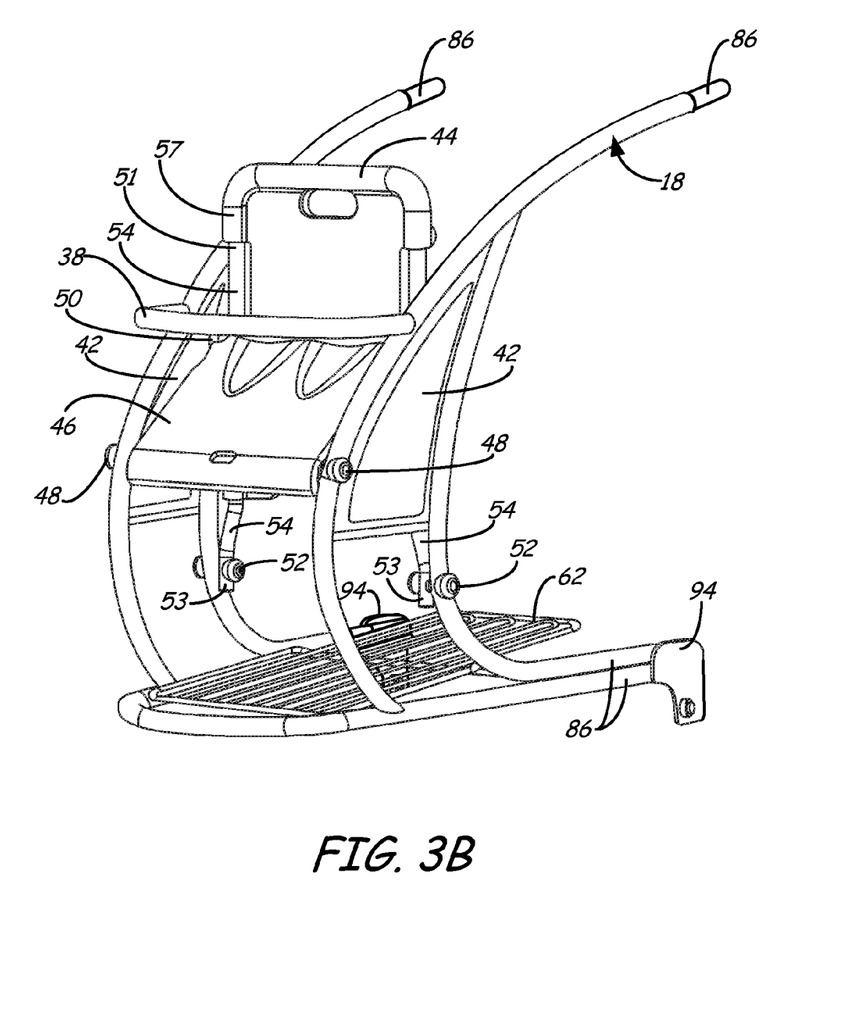
FIG. 3B is a left front perspective view of an exemplary child seat in an intermediate configuration, as shown in FIG. 2B.
Figure 3C:
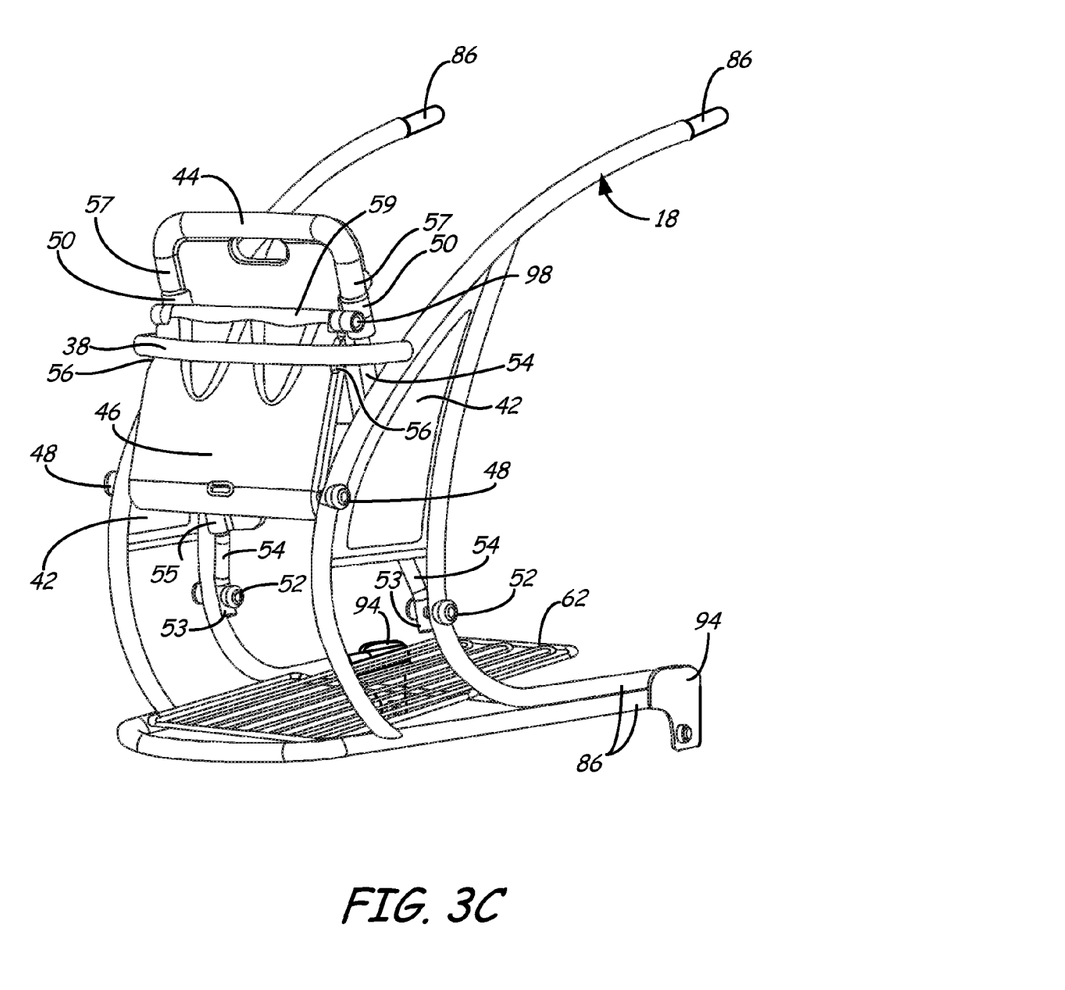
FIG. 3C is a left front perspective view of the exemplary child seat in a fully folded configuration, as shown in FIG. 2C.
Figure 3D:
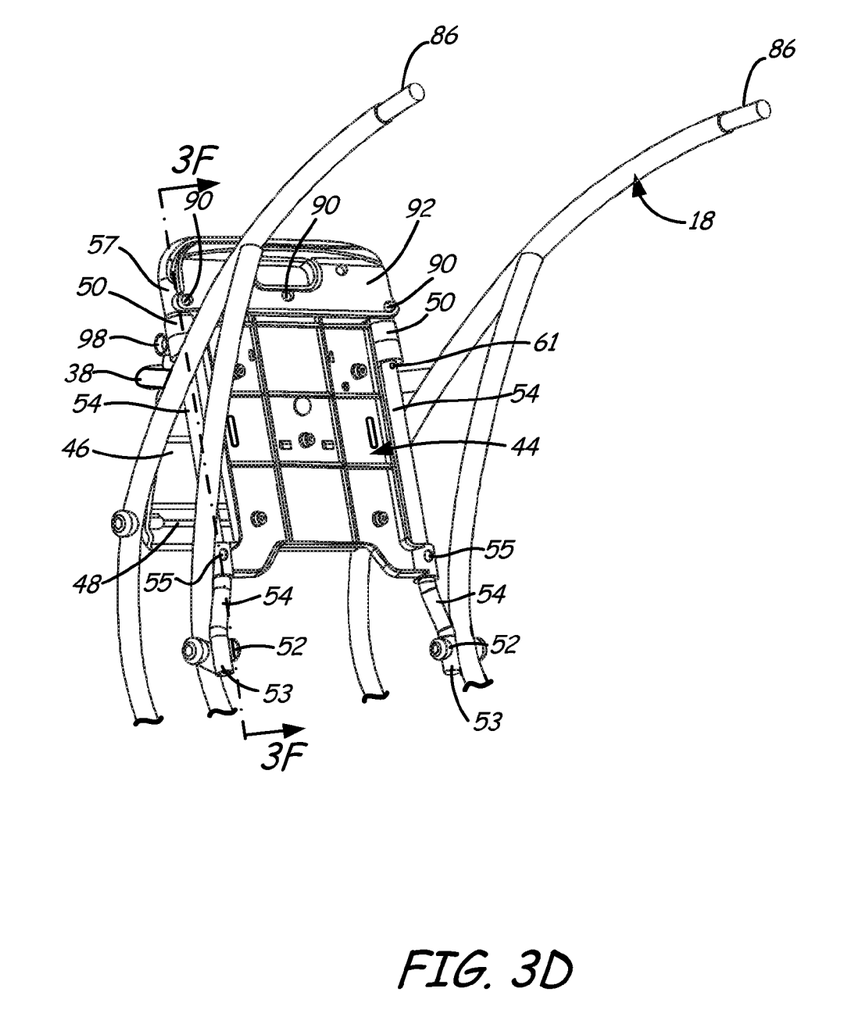
FIG. 3D is a left back perspective view of the exemplary child seat in a fully folded configuration, as shown in FIGS. 2C and 3C.
Figure 3E:
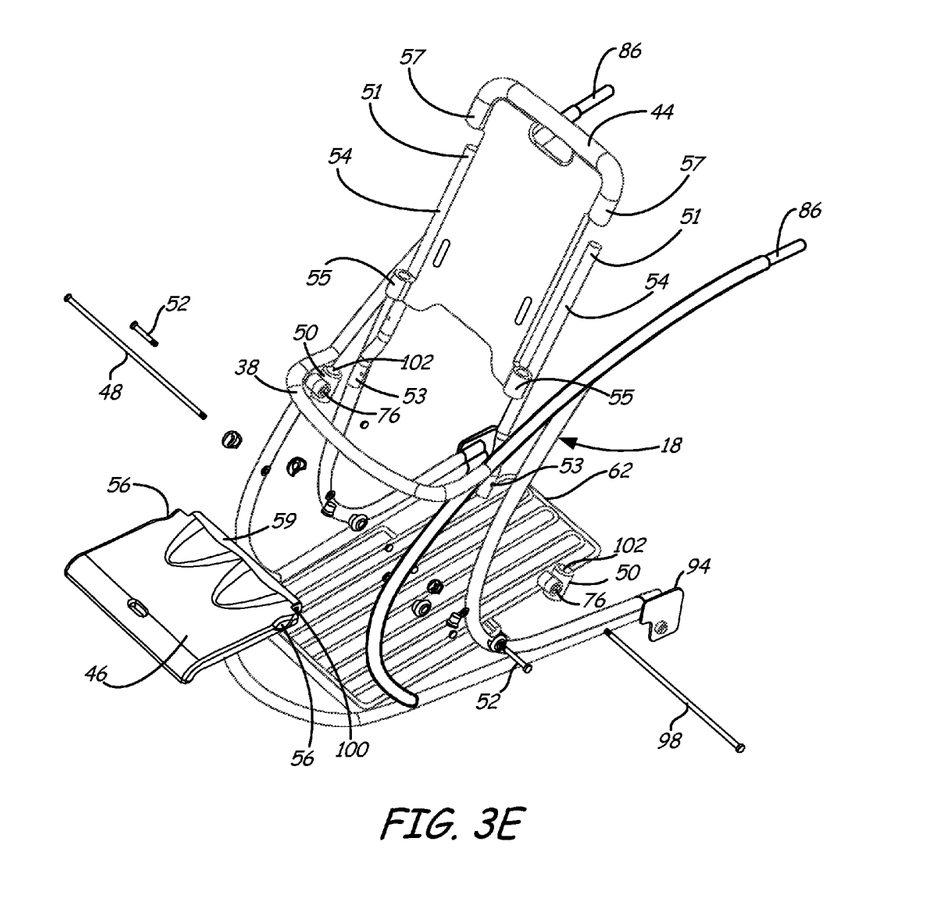
FIG. 3E is a left front perspective exploded view of the components of an exemplary child seat.

FIGS. 3A-3E show the structure and operation of an exemplary child seat 16. In these drawings, the following features have been removed for clarity of illustration: handle 12 with accessory tray 28, cargo bag 14, protective covers 19, wheels 22 and 24, kick plate 26, crotch strap 40 and side buckle straps 41. In FIGS. 3D and 3E, side panels 42 have also been removed. A front of seat bottom 46 is pivotally attached to frame 18 via pin shaft 48. A back of seat bottom 46 is hingedly attached to sleeves 50 via hinge shaft 98. Left and right rods 54 are attached at first ends 51 to seat back 44 and are pivotally attached at second ends 53 to frame 18 via pivot pins 52. An intermediate section of each of rods 54 passes through sleeves 50 and 55. While rods 54 in an exemplary embodiment have a circular cross-sectional shape, it is contemplated that longitudinal elements having other cross-sectional shapes can also be used.

As shown in FIG. 3E, each of sleeves 50 includes a horizontal bore to accept hinge shaft 98, which passes through bore 100 of seat bottom 46. Moreover each of sleeves 50 includes a vertically disposed bore 102 to accept a rod 54. Sleeves 55 of seat back 44 serve as bottom stops for sleeves 50 and casings 57 of seat back 44 serve as top stops for sleeves 50. To fold child seat 16, a rear portion 59 of seat bottom 48 is lifted and/or seat back 44 is moved forward so that sleeves 50 slide upward upon rods 54. Bushings or other bearings may be provided within sleeves 50 to assure smooth operation. In an exemplary embodiment, seat bottom 46 is provided with indentations 56 that securely rest against front bar 38, as shown in FIGS. 3C and 3E.

Figure 3F:
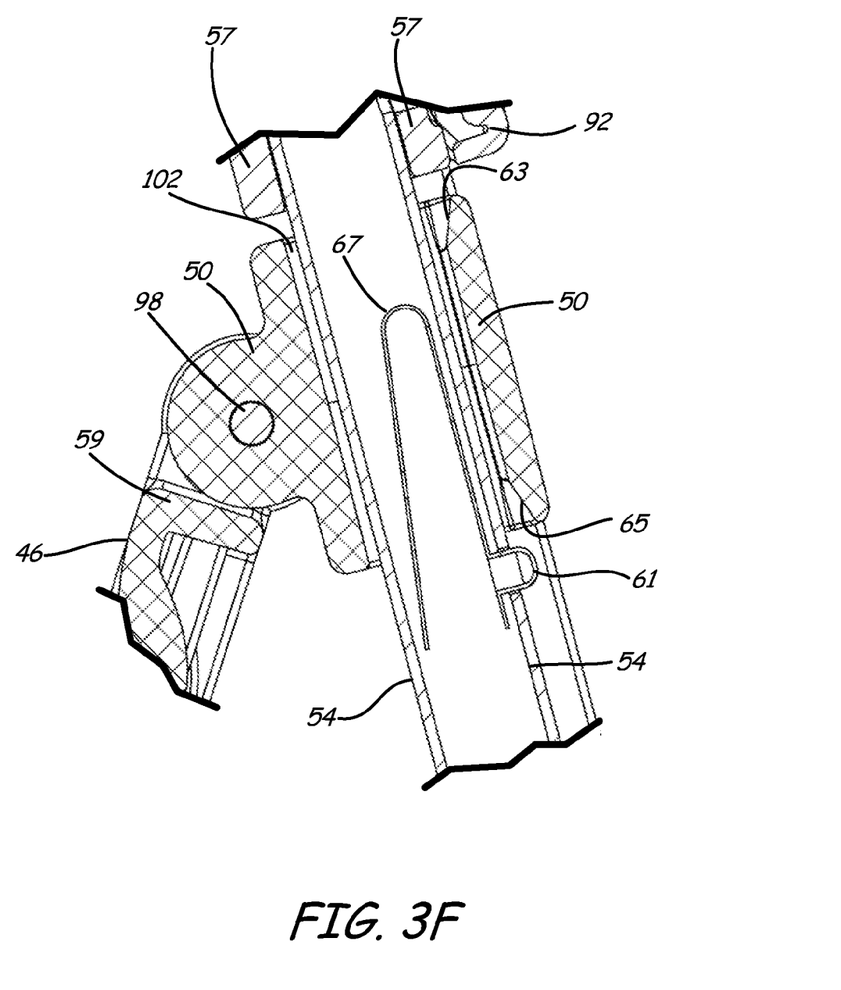
FIG. 3F is a cross-sectional view of the sleeve connecting the back of the seat bottom to the rods along the sides of the seat back and surrounding structures, taken along line 3F-3F of FIG. 3D.

FIG. 3F is a cross-sectional view of the sleeve 50 connecting the back of the seat bottom 59 to the rods 54 along the sides of the seat back 44 and surrounding structures, taken along line 3F-3F of FIG. 3D. A detent mechanism such as spring loaded detent button 61 is used to hold seat back 44 in the fully forward position shown in FIGS. 2C, 3C and 3D, even as cargo bag 14 is loaded with merchandise, which tends to push bottom surface 72 of cargo bag 14 downward. A back side of vertically disposed bore 102 of sleeve 50 is configured with top inner ramp surface 63 and bottom inner ramp surface 65. As sleeve 50 is raised upon rod 54 (such as when moving seat back 44 forward from the position shown in FIG. 3B to the position shown in FIG. 3C), detent button 61 is pushed into rod 54 by upper inner ramp surface 63 and then extends out of rod 54 along bottom inner ramp surface 65. Spring 67 biases detent button 61 out of rod 54, thereby frictionally retaining sleeve 50 above detent button 61. Moreover, the forward lean of seat back 44 prevents sleeves 50 from unintentionally sliding down and causing opening of child seat 16. However, deliberate force applied to purposefully open child seat 16 (such as by pushing back upon seat back 44 to move from the configuration shown in FIG. 3C to the configuration shown in FIG. 3B) is sufficient to cause detent button to become depressed by bottom inner ramp surface 65. Detent button 61 automatically extends out of rod 54 again after passing against upper inner ramp surface 63. One detent button 61 is provided on each rod 54. The illustrated structure using sliding sleeves 50 on rods 54 allows for smooth and reliable operation, without the risk of pinched fingers common in state-of-the-art wire basket child seats.

Figure 4:
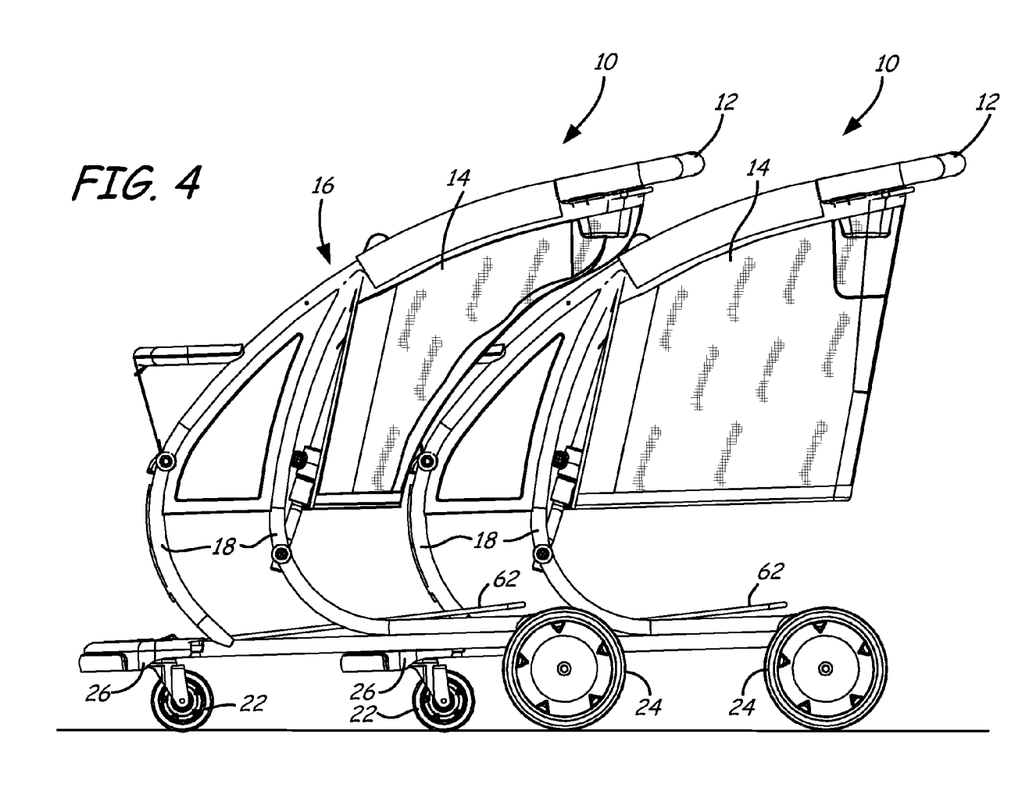
FIG. 4 is a left side view of two shopping carts in a nested configuration.

FIG. 4 shows the nesting of two carts 10, one behind the other. Because cargo bag 14 in an exemplary embodiment is made of a flexible material such as fabric, the front of one cart can be pushed into the rear of another, thereby saving floor space. Moreover, the use of a textile material generally results in a lighter weight cart 10 that is easy to manuever. The spacing between front wheels 22 is also narrower than the spacing between rear wheels 24 in order to facilitate such nesting. Moreover, in an exemplary embodiment, bottom rack 62 has a slight downward slope to the front so that the bottom rack 62 of a cart 10 may fit under the rack 62 of the cart 10 in front of it.

Figure 5:
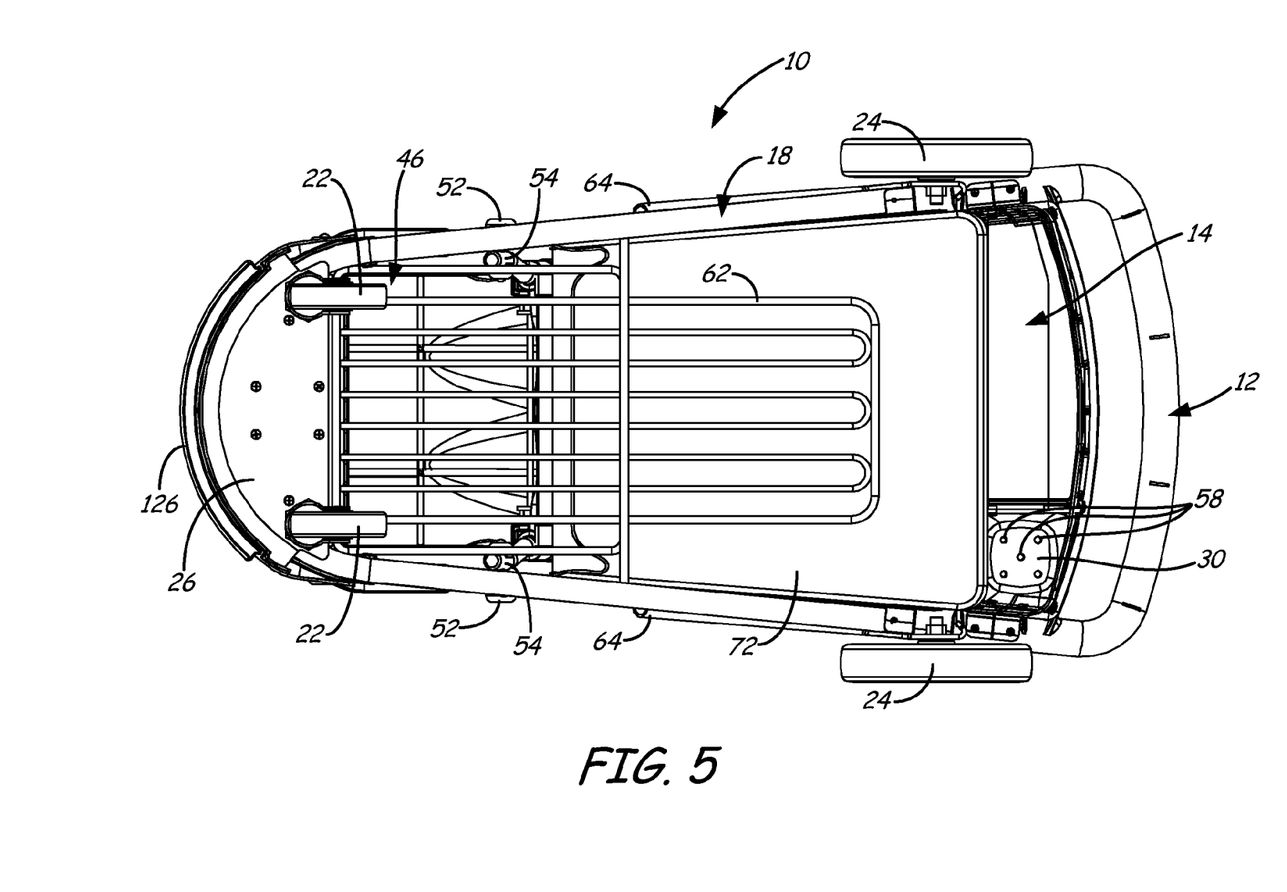
FIG. 5 is a bottom view of the cart of FIG. 1.
Figure 6:
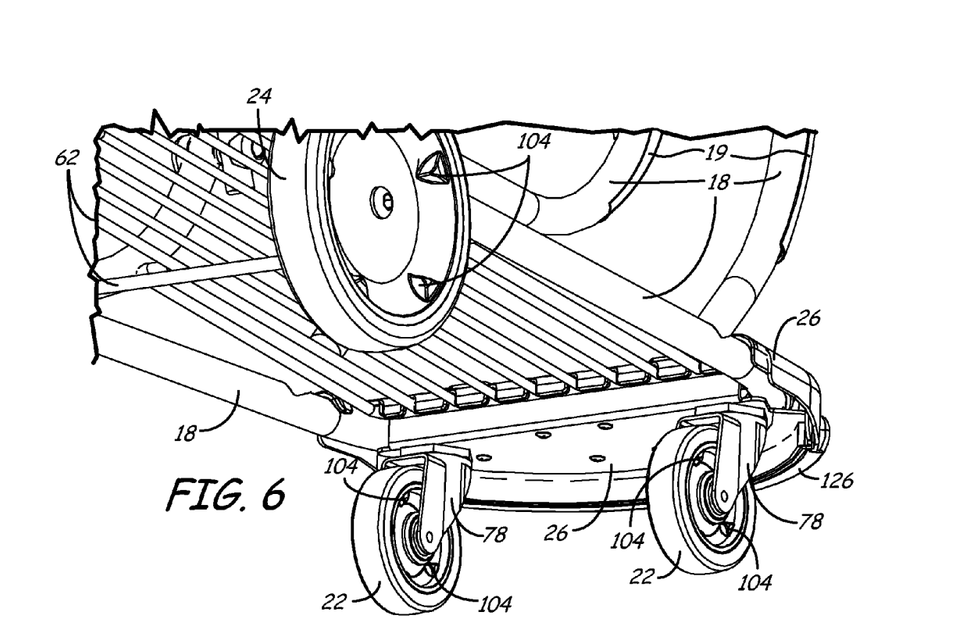
FIG. 6 is a partial bottom right perspective view of the front wheels, kick plate, and bumper of the cart of FIG. 1.
Figure 7:
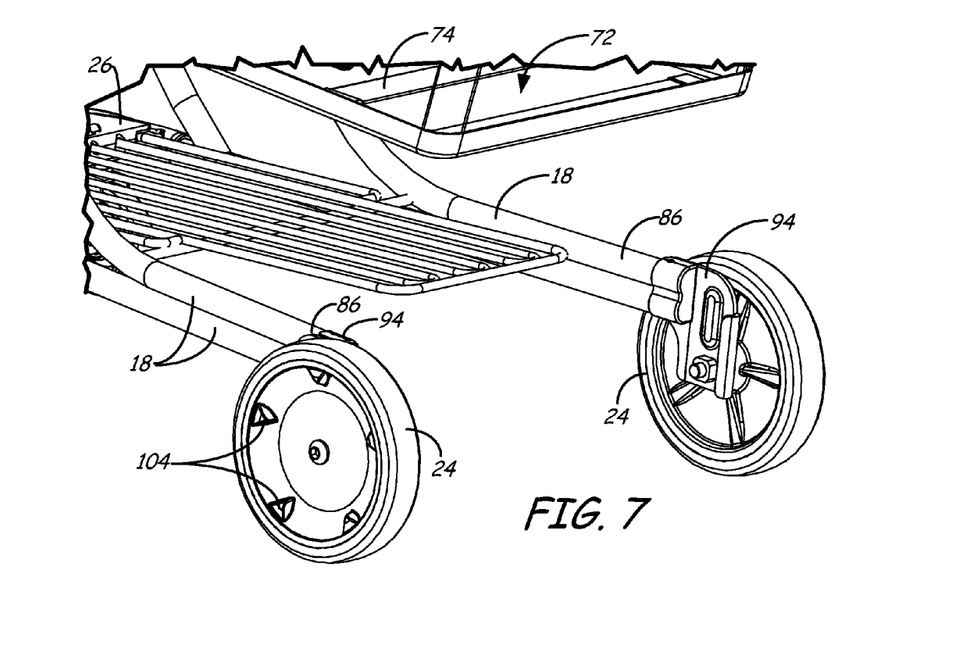
FIG. 7 is a partial left side perspective view of the rear wheels and bottom rack of the cart of FIG. 1.

FIGS. 5-7 show the bottom of cart 10 and various portions thereof. As shown in FIGS. 5 and 6, the front of cart 10 is rounded to allow for a larger front kick plate 26 and bumper 126 while still allowing ample room for the front wheels 22 to fully swivel. In one embodiment, a top portion of kick plate 26 and bumper 126 are co-injection-molded of plastic as a single, easily replaceable part. A bottom portion of kick plate 26 is formed of metal, and fasteners are used to attach the top and bottom portions of kick plate 26 to frame 18. In an exemplary embodiment, wheel mounting hardware 78 is used to mount front wheels 22 onto a bottom portion of kick plate 26 with distance between the front wheels 22 of about 9.5 inches. Front bumper 126 has, in an exemplary embodiment, a length of about 14 inches and height of about 1⅛ inches. Bottom rack 62 is provided for heavy or bulky items.

Wide placement of the front wheels 22 and rear wheels 24 offers enhanced cart stability, while the swiveling of front wheels 22 facilitates maneuverability of the cart 10. Front kick plate 26 protects frame 18 from the impact of children's feet. In an exemplary embodiment, front kick plate 26 is formed from plastic and front bumper 126 is formed from a material such as a thermoplastic elastomer and is easily replaceable. In an exemplary embodiment, front bumper 126 is a snap-fit non-marking bumper. Box stop protrusions 80 (see FIGS. 1-2C) are provided on kick plate 26 to prevent items on rack 62 from sliding too far forward. In an exemplary embodiment, front wheels 22 are significantly smaller than rear wheels 24. In an exemplary embodiment, each of front wheels 22 is a 4 inch diameter caster and each of the rear wheels 24 has a 6, 8, or 9 inch diameter. However, the front wheels and rear wheels 24 may otherwise have similar features. For example, in the illustrated embodiment, each of the wheels 22 and 24 has a triangular motif 104 at 72 degree intervals. Moreover, each of front and rear wheels 22, 24 has a nylon core and non-marking thermoplastic rubber outer layer. Moreover, in an exemplary embodiment, each of front wheel 22 and rear wheel 24 has a steel bushing with zinc plating.

As shown in FIG. 7, in an exemplary embodiment, rear wheels 24 are mounted on brackets 94, which are in turn fixed to lower ends 86 of frame 18. Mounting of rear wheels 24 on an outside of frame 18 allows for a wide wheel base that promotes stability of cart 10. Moreover, such a mounting position allows for a wide clearance between rear wheels 24, thereby facilitating the acceptance of the front portion of a second cart 10, as in the nested configuration shown in FIG. 4.

Figure 8:
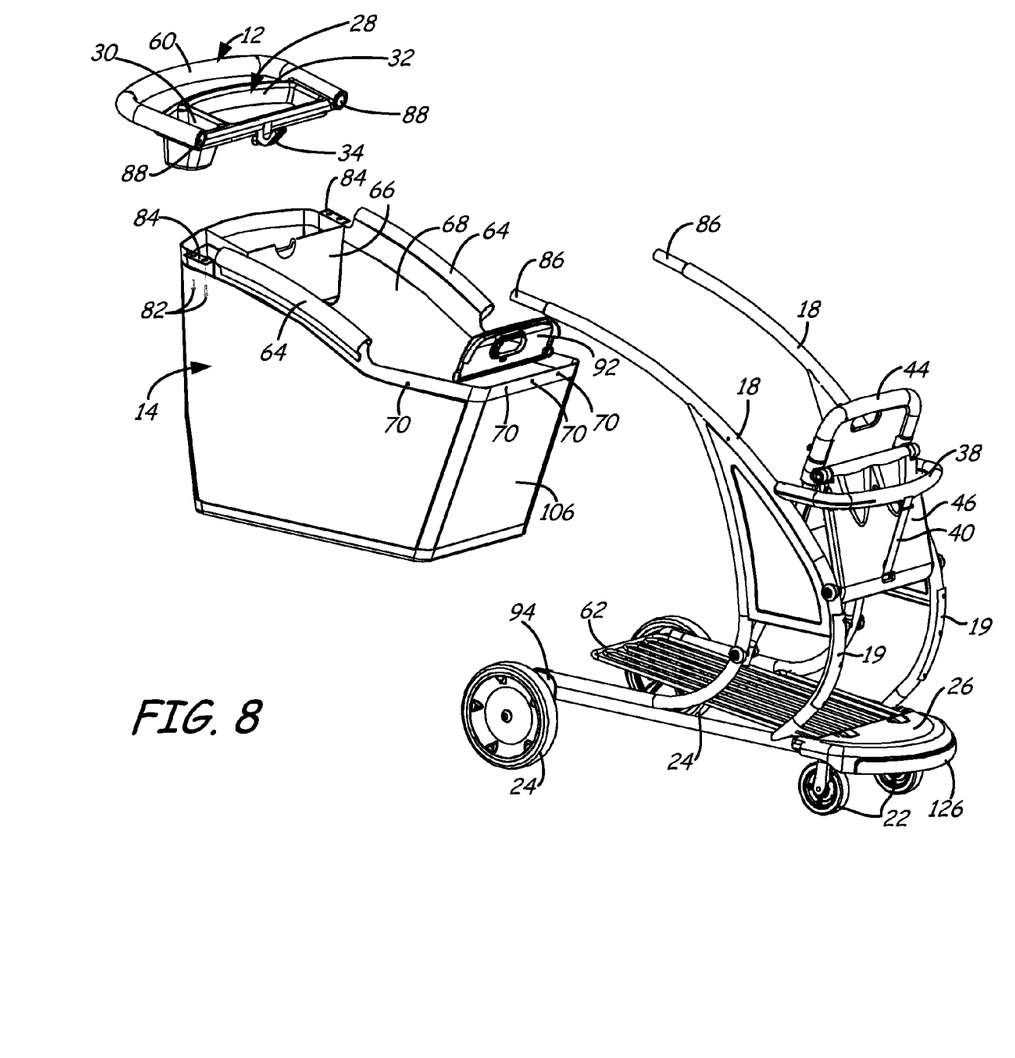
FIG. 8 is a right perspective view of an exemplary cart disassembled for the replacement of the cargo bag.

In an exemplary embodiment, cargo bag 14 is formed of a flexible material such as a textile. It is contemplated that cargo bag 14 may need to be repaired or replaced at more frequent maintenance intervals than the more durable frame 18. FIG. 8 shows cart 10 disassembled to allow for replacement of cargo bag 14. Cargo bag 14 is easily removed from frame 18 and child seat 16 for repair or replacement as needed. In an exemplary embodiment, handle 12 with accessory tray 28 is removed from frame 18 by unfastening screws 82, which pass through brackets 84 of cargo bag 14, and sliding ends 86 of frame 18 out of bores 88 of handle 12. Further, screws 90 (visible in FIG. 3D) are unfastened to allow for removal of seat back plate 92 from seat back 44. In an exemplary embodiment, screws 84 and 90 also secure portions of cargo bag 14 to accessory tray 28 and seat back 44, respectively. Screws and/or other fasteners may also be used, such as through grommets 70, to secure other parts of cargo bag 14 to frame 18. In additional to or as an alternative to the use of grommets 70, a wire may be sewn or otherwise attached to cargo bag 14 and attached by screws or other fasteners to frame 18. With these fasteners removed, loops 64 of cargo bag 14 are easily slid off frame 18 to remove cargo bag 14 from frame 18. Cargo bag 14 can then be replaced with a new or differently configured cargo bag.

Cargo bag 14 is attachable to frame 18 of cart 10 via loops 64 and a plurality of grommets 70, through which fasteners are inserted to secure cargo bag 14 to frame 18 and child seat 16. As illustrated, cargo bag 14 has a smaller compartment 66 for holding small items that might otherwise get lost in the main compartment 68. Smaller compartment 66 is suspended from and accessed through well 32 of accessory tray 28 of handle 12.

Bottom surface 72 and seat attachment surface 106 of cargo bag 14 may be formed of a different material than the rest of cargo bag 14. Because these surfaces 72 and 106 are less visible to on-lookers, they may be formed of a more durable albeit less attractive material than other portions of cargo bag 14. Additional grommets (not shown) may be provided on a bottom surface 72 of cargo bag 14 for drainage. As shown in FIGS. 1 and 7, in an exemplary embodiment, transverse slats 74 are provided on a bottom surface 72 for structural reinforcement and rigidity. In an exemplary embodiment, each transverse slat 74 is formed of fiberglass and held in a pocket sewn into bottom surface 72 or sandwiched between two layers of material that form bottom surface 72. In an exemplary embodiment, each transverse slat 74 is about ⅛ inch think, about 1¾ inch wide, and extends the width of the cargo bag 14.

In an exemplary embodiment, cargo bag 14 has an average front width of about 13.5 inches at seat attachment surface 106, an average rear width of about 16.8 inches, a total length when gussets 36 are extended of about 28.3 inches, and a total height of about 20.3 inches, not including loops 64. An especially suitable material for cargo bag 14 includes a 600-denier polyester textile, for example. Visible indicia such as a store's name and/or logo (not shown) can be provided on the cargo bag 14 by methods including sewing and imprinting, for example. In alternative embodiments, cargo bag 14 or portions thereof (such as the bottom or sides, for example) can be made of a more rigid material such as plastic. Sides or panels of the cargo bag 14 may be provided with grommets, perforations, a mesh configuration or other openings to allow for easy visibility of the contents of the cargo bag as well as ventilation and drainage properties.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A shopping cart comprising:
   an expandable cargo compartment having opposite first and second ends, wherein the expandable cargo compartment is formed from a flexible material and comprises a gusset;
   a frame to which the cargo compartment is attached;
   a handle disposed proximate the first end of the cargo compartment; and
   a foldable child seat disposed proximate the second end of the cargo compartment, wherein folding the child seat increases a capacity of the cargo compartment by opening the gusset, and wherein the child seat comprises a seat back pivotally attached to the frame.

2. A shopping cart comprising:
   an expandable cargo compartment having opposite first and second ends;
   a frame to which the cargo compartment is attached;
   a handle disposed proximate the first end of the cargo compartment;
   a foldable child seat disposed proximate the second end of the cargo compartment, wherein folding the child seat increases a capacity of the cargo compartment, wherein the child seat comprises a seat back pivotally attached to the frame, and wherein the foldable child seat comprises:
   a rod pivotally attached to the frame;
   a seat back attached to the rod;
   a sleeve configured to slide upon the rod; and
   a seat bottom hingedly attached to the sleeve.

3. The shopping cart of claim 2 comprising first and second rods attached to left and right sides of the seat back, respectively.

4. The shopping cart of claim 2 wherein the sleeve comprises:
- a vertically disposed bore that accepts the rod; and
- a horizontal bore that accepts a hinge of the seat bottom.

5. The shopping cart of claim 2 wherein the seat back comprises top and bottom stops that limit a sliding of the sleeve upon the rod.

6. The shopping cart of claim 2 wherein at least one of the first and second rods comprises a detent mechanism that retains the foldable child seat in a folded configuration.

7. The shopping cart of claim 2 wherein sliding the sleeve upwardly upon the rod correlates with the seat back moving forward and folding of the child seat and wherein sliding the sleeve downwardly upon the rod correlates with the seat back moving backward and opening of the child seat.

8. The shopping cart of claim 2, wherein the expandable cargo compartment is formed from a flexible material.

9. The shopping cart of claim 8, wherein the cargo compartment comprises a gusset and wherein folding the child seat comprises opening the gusset.

10. A shopping cart comprising:
- a frame;
- a cargo compartment attached to the frame;
- a handle attached to the frame;
- a foldable child seat comprising:
  - a rod pivotally attached to the frame;
  - a seat back attached to the rod;
  - a sleeve configured to slide upon the rod; and
  - a seat bottom hingedly attached to the sleeve.

11. The shopping cart of claim 10 further comprising an accessory tray attached to the handle.

12. The shopping cart of claim 11, wherein the cargo compartment comprises a smaller compartment within a main compartment and wherein the smaller compartment is attached to the accessory tray.

13. The shopping cart of claim 11 wherein the accessory tray further comprises a hook.

14. The shopping cart of claim 10 wherein the rod comprises a detent mechanism that retains the sleeve in a position on the rod.

15. The shopping cart of claim 10, wherein the cargo compartment is formed from a flexible material.

16. The shopping cart of claim 15 further comprising a plurality of reinforcing slats disposed on a bottom surface of the cargo compartment.

17. The shopping cart of claim 10, wherein the cargo compartment is attached to the seat back.

18. The shopping cart of claim 17, wherein the cargo compartment comprises a gusset and wherein moving the seat back opens and closes the gusset, thereby changing a capacity of the cargo compartment.

19. The shopping cart of claim 10 wherein the handle is removably attached to the frame and wherein the cargo compartment is removably attached to the frame.

20. The shopping cart of claim 19 wherein the cargo compartment comprises a plurality of loops from which it is suspended from the frame.

* * * * *